(12) United States Patent
Kang et al.

(10) Patent No.: US 9,288,760 B2
(45) Date of Patent: Mar. 15, 2016

(54) METHOD AND APPARATUS FOR CONTROLLING UPLINK TRANSMIT POWER WITH OPTIMUM DELAY

(71) Applicant: QUALCOMM Incorporated, San Diego, CA (US)

(72) Inventors: Insung Kang, San Diego, CA (US); Surendra Boppana, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/916,336

(22) Filed: Jun. 12, 2013

(65) Prior Publication Data

US 2014/0098726 A1    Apr. 10, 2014

Related U.S. Application Data

(60) Provisional application No. 61/712,061, filed on Oct. 10, 2012.

(51) Int. Cl.
| | | |
|---|---|---|
| *H04W 52/00* | (2009.01) | |
| *H04W 52/02* | (2009.01) | |
| *H04W 52/54* | (2009.01) | |
| *H04W 52/56* | (2009.01) | |
| *H04W 52/58* | (2009.01) | |
| *H04W 52/60* | (2009.01) | |

(52) U.S. Cl.
CPC ........ *H04W 52/0235* (2013.01); *H04W 52/545* (2013.01); *H04W 52/56* (2013.01); *H04W 52/58* (2013.01); *H04W 52/60* (2013.01)

(58) Field of Classification Search
CPC .............................. H04W 52/00; H04W 52/54
See application file for complete search history.

(56) References Cited

U.S. PATENT DOCUMENTS

| | | | |
|---|---|---|---|
| 6,587,510 B1 * | 7/2003 | Minami et al. | 375/285 |
| 6,747,963 B1 * | 6/2004 | Park et al. | 370/335 |
| 7,082,108 B2 | 7/2006 | Hwang et al. | |

(Continued)

FOREIGN PATENT DOCUMENTS

JP    H11308165 A    11/1999

OTHER PUBLICATIONS

International Search Report and Written Opinion—PCT/US2013/063834—ISA/EPO—Nov. 15, 2013.

(Continued)

*Primary Examiner* — Alex Skripnikov
(74) *Attorney, Agent, or Firm* — Arent Fox LLP (57) ABSTRACT

A method and apparatus for controlling uplink transmit power with optimum delay is described. A transmit power control command may be received. A time slot of the transmit power control command may be determined. Based on the time slot, it may be determined to decode the transmit power control command, with a delay. The transmit power control command may be decoded, after the delay, using a transmit power control command decoding graph by determining a strength of the transmit power control command and plotting the strength on the transmit power control command decoding graph. The transmit power control command decoding graph may include regions. Decoding the transmit power control command, after the delay, may be based on a region associated with plotting the strength of the transmit power control command.

26 Claims, 7 Drawing Sheets

(56) References Cited

U.S. PATENT DOCUMENTS

| | | |
|---|---|---|
| 2003/0220122 A1 | 11/2003 | Lim et al. |
| 2004/0066772 A1 | 4/2004 | Moon et al. |
| 2005/0036441 A1* | 2/2005 | Laroia et al. .................. 370/203 |
| 2007/0054691 A1 | 3/2007 | Sankar et al. |
| 2008/0192660 A1* | 8/2008 | Li et al. ......................... 370/294 |
| 2008/0207247 A1* | 8/2008 | Gholmieh et al. ............ 455/522 |
| 2010/0265840 A1 | 10/2010 | Catreux-Erceg et al. |
| 2011/0267994 A1* | 11/2011 | Pan et al. ...................... 370/280 |
| 2013/0322332 A1* | 12/2013 | Tsai ............................... 370/328 |

OTHER PUBLICATIONS

3GPP TS 25.214 B10.6.0 *3rd Generation Partnership Project; Technical Specification Group Radio Access Network; Physical Layer Procedures* (FDD) (Release 10), dated (Mar. 2012).

\* cited by examiner

METHOD AND APPARATUS FOR CONTROLLING UPLINK TRANSMIT POWER WITH OPTIMUM DELAY

CLAIM OF PRIORITY UNDER 35 U.S.C. §119

The present Application for Patent claims priority to Provisional Application No. 61/712,061 entitled "UPLINK POWER CONTROL MECHANISM" filed Oct. 10, 2012, and assigned to the assignee hereof and hereby expressly incorporated by reference herein.

BACKGROUND

1. Field

Aspects of the present disclosure relate generally to wireless communication systems, and more particularly, to a method and apparatus for controlling uplink transmit power control with optimum delay.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

Generally, uplink (also referred to as "UL") transmit power control in a mobile communication system balances the need for sufficient energy transmitted per bit to achieve a desired quality of service (e.g., data rate and error rate), against the need to minimize interference to other users of the system and to maximize the battery life of a user equipment (UE). To accomplish this goal, uplink transmit power control has to account for characteristics of a radio propagation channel, including path loss, shadowing, fast fading and interference from other users in the same cell and adjacent cells.

In a TD-SCDMA system, uplink transmit power of a UE is typically controlled by uplink transmit power control commands (e.g., Transmit Power Control (TPC) commands or TPC_cmds) that are sent from a base station (e.g., a Node B in UMTS) to the UE through a downlink (also referred to as "DL") channel. For example, a Node B attempts to maintain a signal-to-interference (SIR) target for received signals from the UE, and sends transmit power control commands to the UE based on how an estimated SIR of a received signal compares to the SIR target. The UE decodes these transmit power control commands, which may be represented as bits (e.g., where a "−1" represents a "down" or reduce power command, "1" represents an "up" or increase transmit power command, and a "0" represents a "hold" command) and adjusts the uplink transmit power accordingly.

UE power consumption is dependent on both delays in decoding transmit power control commands and accuracy of decoding transmit power control commands. Long decoding delays (e.g., several subframes) may result in an undesirable amount of power consumption at the UE. Such decoding delays may be a result of using Binary Phase-Shift Keying (BPSK) modulation to decode transmit power control commands. As such, it is desirable to provide power savings at the UE. It is also desirable to reduce decoding delays while maintaining, or improving, decoding accuracy at the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for controlling uplink transmit power is described. The method may include receiving a transmit power control command. The method may include determining a time slot of the transmit power control command. The method may include determining to decode the transmit power control command, with a delay, based on the time slot. The method may include decoding the transmit power control command, after the delay, using a transmit power control command decoding graph.

In an aspect, a computer program product for controlling uplink transmit power may include a computer-readable medium including code. The code may cause a computer to receive a transmit power control command. The code may cause a computer to determine a time slot of the transmit power control command. The code may cause a computer to determine to decode the transmit power control command, with a delay, based on the time slot. The code may cause a computer to decode the transmit power control command, after the delay, using a transmit power control command decoding graph.

In an aspect, an apparatus for controlling uplink transmit power is described. The apparatus may include means for receiving a transmit power control command. The apparatus may include means for determining a time slot of the transmit power control command. The apparatus may include means for determining to decode the transmit power control command, with a delay, based on the time slot. The apparatus may include means for decoding the transmit power control command, after the delay, using a transmit power control command decoding graph.

In an aspect, an apparatus for controlling uplink transmit power is described. The apparatus may include at least one memory. The apparatus may include a transmit power control module configured to receive a transmit power control command. The apparatus may include a time slot module configured to determine a time slot of the transmit power control command. The apparatus may include a decoding module configured to determine to decode the transmit power control command, with a delay, based on the time slot, and decode the transmit power control command, after the delay, using a transmit power control command decoding graph.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The various concepts presented throughout this disclosure may be implemented across a broad variety of telecommunication systems, network architectures, and communication standards. By way of example and without limitation, the aspects of the present disclosure are presented with reference to a Universal Mobile Telecommunications System (UMTS) system employing a Time Division-Synchronous Code Division Multiple Access (TD-SCDMA) standard.

In a TD-SCDMA system, uplink transmit power of a user equipment (UE) may be controlled by transmit power control commands, also referred to as uplink (UL) Transmit Power Control (ULTPC or TPC) commands, that are sent from a base station (e.g., a Node B in UMTS) to the UE through a downlink (DL) channel. The UE may decode transmit power control commands and adjust uplink transmit power accordingly. A transmit power control command includes bits, where a "−1" represents a "down" or reduce power command and a "1" represents an "up" or increase transmit power command. The UE also may decode a transmit power control command as a "0", which represents a "hold" command, when the transmit power control command is determined to be unreliable.

UE power consumption is dependent on both delays in decoding transmit power control commands and accuracy of decoding transmit power control commands. Power savings at the UE may be gained by reducing delays in transmit power control command decoding. Such delays may be reduced while maintaining, or improving, decoding accuracy. For example, it may be desirable to have a delay of one subframe between the UE receiving a transmit power control command on the downlink from the Node B and the UE adjusting the uplink transmit power based on the received transmit power control command.

In an aspect, Quadrature Phase-Shift Keying (QPSK) modulation may be used to help reduce delays associated with decoding transmit power control commands at a UE. QPSK uses four points on a constellation diagram, equispaced around a circle. With four phases, QPSK can encode two bits per symbol, to minimize bit error rate (BER). QPSK may be used to double the data rate compared with a Binary Phase-Shift Keying (BPSK) system, while maintaining the same bandwidth of a signal, or to maintain the data rate of BPSK but needing only half of the bandwidth of BPSK.

Figure 1:
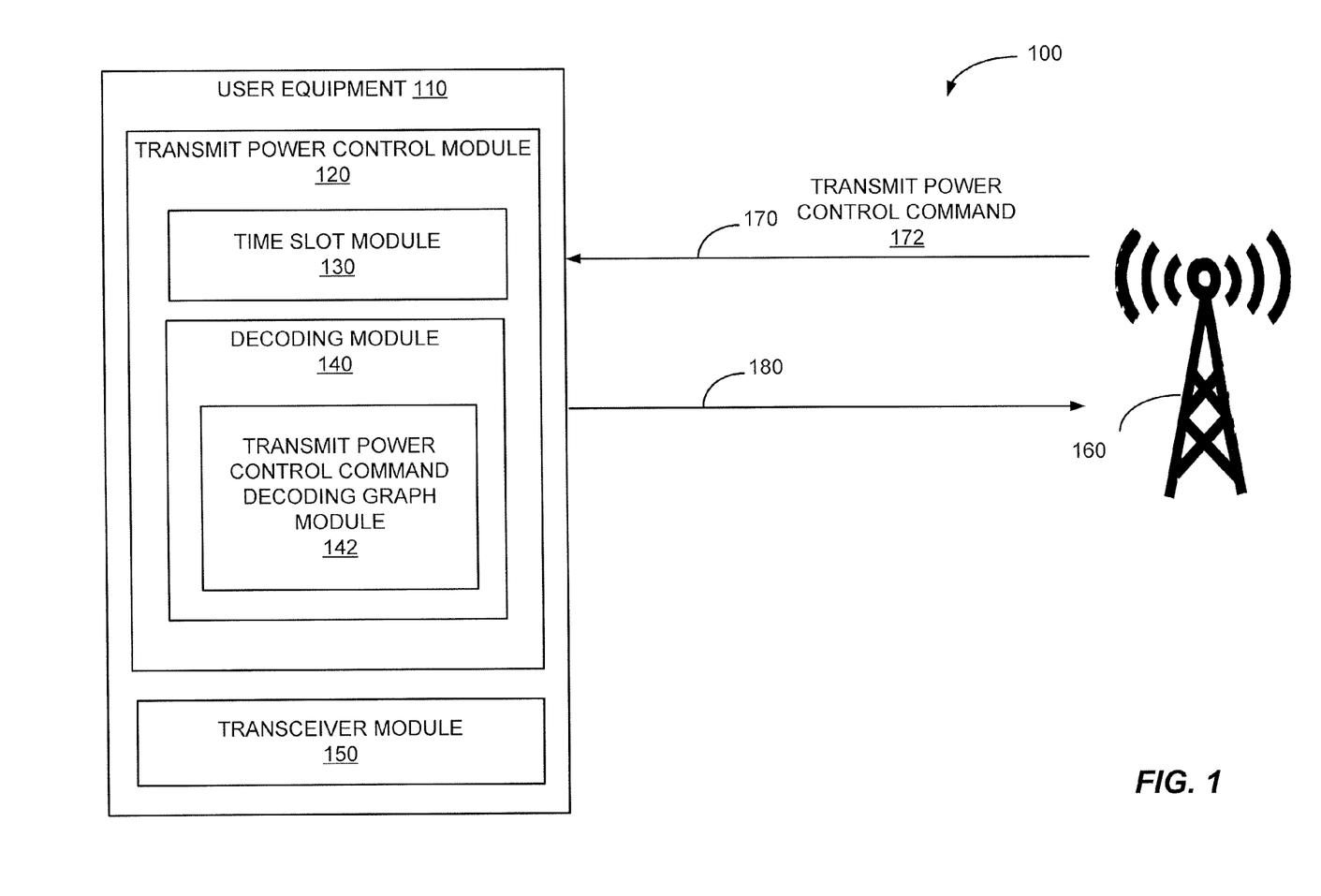
FIG. 1 is a block diagram illustrating a wireless communication system including a user equipment (UE) in communication with a Node B.

Referring to FIG. 1, a wireless communication system 100 includes a user equipment (UE) 110 in communication with a Node B 160. In an aspect, the wireless communication system may be a UMTS system employing a TD-SCDMA standard.

Node B 160, which also may be referred to as a base station, access point, or node, may be a macrocell, picocell, femtocell, relay, UE (e.g., communicating in peer-to-peer or ad-hoc mode with UE 110), or substantially any type of component that can communicate with UE 110 to provide wireless network access. UE 110 may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

UE 110 includes transmit power control module 120 configured to receive a transmit power control command 172 from Node B 160 on downlink channel 170. A transmit power control command 172 in TD-SCDMA may be referred to as a TPC command, or TPC_cmd. Transmit power control module 120 also may be configured to control transmission power of uplink channel 180 based on the received transmit power control command 172. In an aspect, for example, UE 110 includes transceiver module 150 configured to receive transmit power control command 172 on the downlink channel 170. Transceiver module 150 also may be configured to transmit on the uplink channel 180 based on power control determined by UE 110.

Transmit power control module 120 may include time slot module 130 configured to determine a time slot of transmit power control command 172. Transmit power control command 172 may be sent by Node B 160 as part of a TD-SCDMA frame, described herein with respect to FIG. 2. Each frame may be divided into subframes and each subframe may be divided into time slots. The time slots may be denoted as TS0, TS1, TS2, TS3, TS4, TS5, and TS6.

Generally, transmit power control commands in TD-SCDMA may control an uplink Coded Composite Transport Channel-Time Slot (UL CCTrCh-TS) based on the time slot in which the transmit power control command is located within the subframe. In TD-SCDMA, a frame may be 10 ms, which may be subdivided into 2 equal 5 ms subframes, as described herein with respect to FIG. 2. The bit streams in CCTrCH are mapped onto code channels of time slots in the subframes. As such, a transmit power control command in a particular time slot may control a bit stream in CCTrCH to which the particular time slot is mapped. As such, based on this structure, time slot module 130 is configured to detect a time slot associated with a received transmit power control command.

In an aspect, if transmit power control command 172 is received in any one of time slots TS0, TS1, TS2, TS3, TS4, and/or TS5, transmit power control module 120 may be configured to adjust uplink transmit power in a subframe subsequent to the subframe in which the transmit power control command 172 was received. In other words, transmit power control commands may be decoded, and applied to determine uplink transmit power, before the end of a last time slot (TS6) of a subframe. As such, there may be a decoding delay of one subframe. However, and in an aspect, if the transmit power control command 172 is received in the last time slot (TS6) of the subframe, then transmit power control module 120 may not be able to adjust the uplink transmit power in the subsequent subframe. In this case, according to an aspect, the decoding delay may be two subframes. In an aspect, such two subframe delay may be a constant delay to avoid, for example, unnecessary power consumption at UE 110.

In an aspect, a transmit power control command 172 may be spread across two time slots. In one example, the transmit power control command 172, which may be spread across a non-TS6 time slot and the TS6 time slot, may control the same UL CCTrCh-TS pair. In another example, the transmit power control command 172 spread across a non-TS6 time slot and the TS6 time slot may control separate CCTrCh-TS pairs (e.g., the non-TS6 time slot controls a first CCTrCh-TS pair and the TS6 time slot controls a second CCTrCh-TS pair).

As such, in an aspect, if the transmit power control command 172 is within a non-TS6 (e.g., one of TS0, TS1, TS2, TS3, TS4, or TS5) time slot and the TS6 time slot, transmit power control module 120 may be configured to adjust uplink transmit power based on the power control information in the non-TS6 time slot. In another aspect, if the transmit power control command 127 is within non-TS6 and TS6 time slots, transmit power control module 120 may be configured to adjust uplink transmit power based on the power control command in the TS6 time slot of the current subframe and power control command in the non-TS6 time slot of a subsequent frame. In a case where a transmit power control command is in time slot TS6, the decoding delay may be two subframes. In an aspect, such two subframe delay may be a constant delay.

Figure 3:
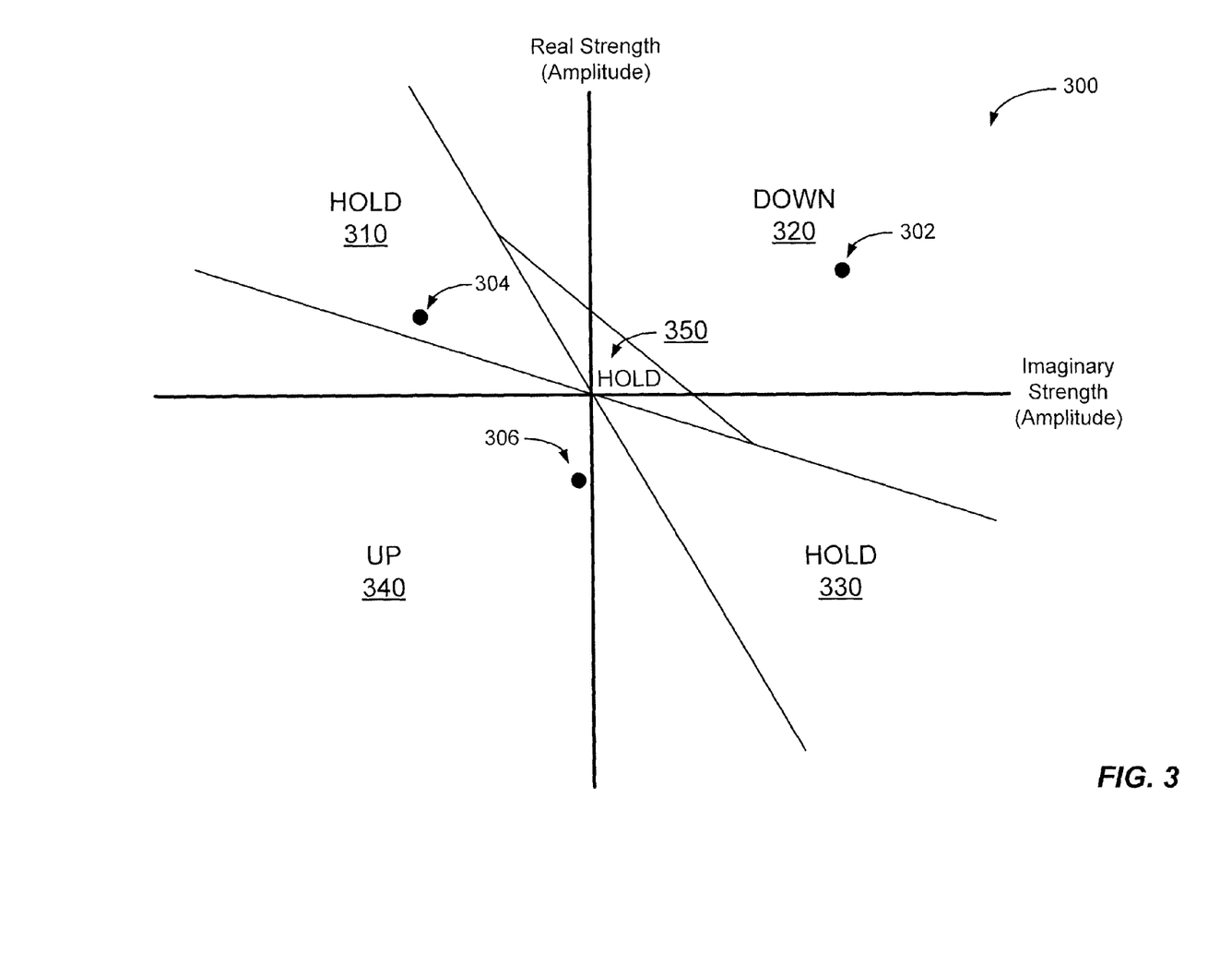
FIG. 3 is an illustration of a transmit power control command decoding graph, including regions.

Transmit power control module 120 may include decoding module 140 for decoding transmit power control command 172 using a transmit power control command decoding graph, which is described herein with respect to FIG. 3. In an aspect, decoding module 140 may be configured to determine whether to decode the transmit power control command 172 based on the time slot(s) determined to include the transmit power control command 172 by time slot module 130. In an aspect, if transmit power control command 172 occupies TS6, either alone or in combination with another time slot when the transmit power control command 172 is spread across two time slots, decoding module 140 may be configured to determine to decode the transmit power control command 172 not in a subsequent subframe and with a two subframe delay. In another aspect, if transmit power control command 172 occupies one or more (when the transmit power control command is spread across two time slots) non-TS6 time slot(s), decoding module 140 may be configured to determine to decode the transmit power control command 172 in a subsequent subframe and with a one subframe delay. In an aspect, decoding module 140 may be configured to decode a transmit power control command as a default command of "hold".

In an aspect, decoding module 140 includes transmit power control command decoding graph module 142 configured to use a two-dimensional graph, described herein with respect to FIG. 3, to decode transmit power control command 172. A transmit power control command decoding graph may be generated based on characteristics of TD-SCDMA transmit power control commands. The transmit power control command decoding graph may have regions corresponding to an "up" or increase transmit power command (represented as "1"), a "down" or reduce power command (represented as "−1"), and "hold" or do not adjust power command (represented as "0"), as described by the TD-SCDMA standard.

In an aspect, decoding module 140 may be configured to determine a strength of the transmit power control command 172. Transmit power control command 172 may be represented by a symbol, which has a real part and an imaginary part. Each of the real part and the imaginary part have a strength, which may be represented as an amplitude value. Decoding module 140 may be configured to plot the strength (in amplitude) of each of the real and imaginary parts of the transmit power control command 172 onto the transmit power control command decoding graph. Decoding module 140 may be configured to decode the transmit power control command 172 based on a region wherein the strength of the transmit power control command is plotted. For example, if a result of plotting transmit power control command 172 onto the transmit power control command decoding graph yields a point that falls within the "up" region, decoding module 140 may decode transmit power control command 172 as "up". In another example, if a result of plotting transmit power control command 172 onto the transmit power control command decoding graph yields a point that falls within the "down" region, decoding module 140 may decode transmit power control command 172 as "down." In yet another example, if a result of plotting transmit power control command 172 onto the transmit power control command decoding graph yields a point that falls within the "hold" region, the transmit power control command 172 may be decoded as a "hold". The "hold" region of the transmit power control command decoding graph may be selected based on a determination that points within the "hold" region(s) may represent unreliable transmit power control commands and, as such, the UE 110 and/or transmit power control module 120 may be configured to not adjust uplink transmit power control based on such unreliable transmit power control commands.

In an aspect, there may not be a continuous transmission on the downlink because of characteristics of Time-Division Multiplexing (TDD) and/or Discontinuous Transmission (DTX) associated with a particular wireless communication system (e.g., TD-SCDMA). In a non-limiting example, Node B 160 may transmit to UE 110 on downlink channel 170 for four subframes, not transmit for four subframes, and then transmit for four subframes. As such, and in an aspect, decoding module 140 may be configured to decode transmit power control command 172 when a current subframe has an active uplink transmission status during a time when downlink communications are discontinuous. For example, and in an aspect, if there is no activity in a current subframe K−1, then decoding module 140 may be configured to not decode a transmit power control command associated with a current subframe K. In an aspect, decoding module 140 may decode the transmit power control command associated with current subframe K as "hold". As such, the decoding delay may be one subframe.

Figure 2:
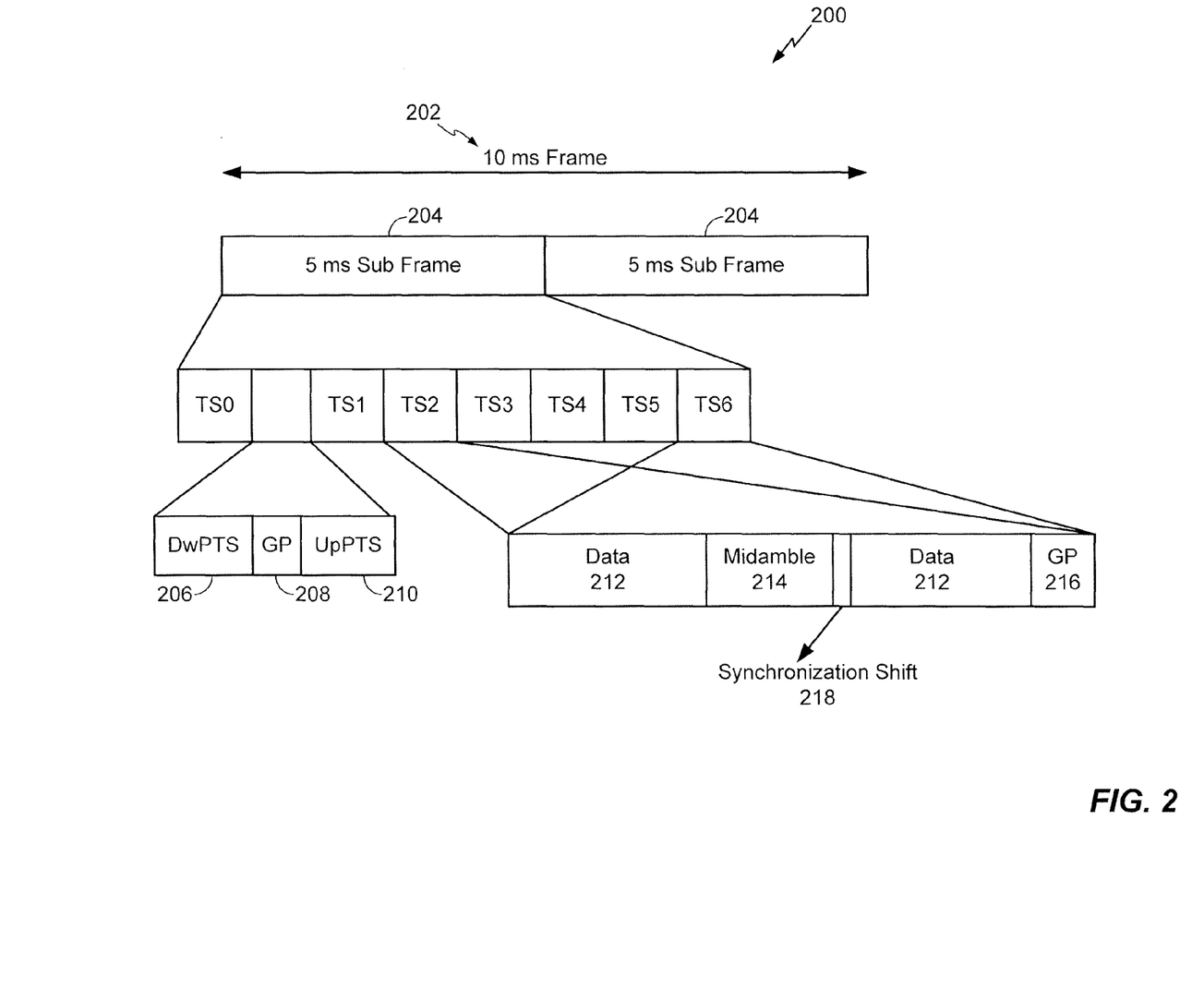
FIG. 2 is a block diagram illustrating an example of a frame structure in a telecommunications system.

Referring to FIG. 2, TD-SCDMA uses a Time-Division Duplex (TDD) mode, which transmits uplink traffic and downlink traffic in a single frame in different time slots. As such, the uplink and downlink spectrum is flexibly assigned based on the type of information being transmitted in the frame. When asymmetrical data (e.g., email and Internet access) are transmitted from a Node B (e.g., Node B 160 of FIG. 1), more time slots may be used for downlink than for uplink. The same number of time slots may be used for the uplink and downlink when the frame is being used to transmit symmetrical services (e.g., telephony).

A frame structure 200 for a TD-SCDMA carrier includes a frame 202 that is 10 ms in length. The chip rate in TD-SCDMA is 1.28 Megachips per second (Mcps). The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission in either the uplink or downlink direction.

A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing with respect to upload transmit timing. The positions of the SS bits 218 are not generally used during uplink communications.

Transmit power control commands in TD-SCDMA may control an uplink Coded Composite Transport Channel-Time Slot (UL CCTrCh-TS) based on the time slot in which the transmit power control command is located within the subframe. The bit streams in CCTrCH are mapped onto code channels of time slots TS0 through TS6 in the subframes 204. As such, a transmit power control command in a particular time slot may control a bit stream in CCTrCH to which the particular time slot is mapped.

In an aspect, if transmit power control command 172 of FIG. 1 is received in any one of time slots TS0, TS1, TS2, TS3, TS4, and/or TS5, transmit power control module 120 of FIG. 1 may adjust uplink transmit power in a subframe subsequent to the subframe in which the transmit power control command 172 was received. For example, if the transmit power control command 172 was received in a time slot of subframe K−1, transmit power control module 120 may adjust uplink transmit power in subframe K. As such, there may be a decoding delay of one subframe. However, and in an aspect, if the transmit power control command 172 is received in the last time slot (TS6) of the subframe (e.g., subframe K), then transmit power control module 120 may not be able to adjust the uplink transmit power in the subsequent subframe (e.g., subframe K−1). In this case, the decoding delay may be two subframes. In an aspect, such two subframe delay may be a constant delay.

Referring to FIG. 3, a two-dimensional transmit power control command decoding graph 300 includes regions 310, 320, 330, 340, and 350 that represent possible decoding results for transmit power control commands associated with a wireless communication system (e.g., TD-SCDMA). For example, in TD-SCDMA, a transmit power control command (e.g., a TPC command or TPC_cmd) may designate "up" or increase uplink transmit power (represented as "1") or "down" or reduce uplink transmit power (represented as "−1"). As such, UE 110 and/or decoding module 140 may decode a "1" as "up", or increase uplink transmit power, and "−1" as "down", or decrease uplink transmit power. If a particular transmit power control command is determined to be unreliable by UE 110, it may be decoded by UE 110 and/or decoding module 140 as a "hold" or do not adjust uplink transmit power. A transmit power control command may be deemed unreliable, for example, if the signal-to-interference ratio (SIR) of the command is lower than a minimum value, or based on some other metric. As such, and in the non-limiting example of FIG. 3, region 340 is an "up" region, region 320 is a "down" region, and regions 310, 330, and 350 are "hold" regions.

A transmit power control command 172 may be provided to UE 110 as a symbol within a subframe time slot. Each symbol includes a real part and an imaginary part, which represent a real and imaginary strength (or similar metric) in terms of amplitude of the transmit power control command, respectively. Transmit power control command decoding graph 300 has an x-axis that represents imaginary strength (or similar metric) of a transmit power control command and a y-axis that represents real strength (or similar metric) of a transmit power control command, both in terms of amplitude. UE 110, decoding module 140, and/or transmit power control command decoding graph module 142 may be configured to plot the real and imaginary parts of a transmit power control command against the x-axis and y-axis of the transmit power control command decoding graph 300 to identify a point in the two-dimensional space of the graph. In an aspect, if UE 110 is decoding multiple transmit power control commands, the transmit power control commands may be combined in some way before plotting the, now combined, transmit power control commands onto transmit power control command decoding graph 300.

UE 110, decoding module 140, and/or transmit power control command decoding graph module 142 may be configured to determine a region (e.g., regions 310, 320, 330, 340, or 350) within which with the plotted transmit power control command falls. In other words, the point plotted on the transmit power control command decoding graph 300 that represents the transmit power control command may fall within one of regions 310, 320, 330, 340, and 350. As such, UE 110, decoding module 140, and/or transmit power control command decoding graph module 142 may be configured to decode the transmit power control command based on a region of the transmit power control command decoding graph 300.

Transmit power control command decoding graph 300 also includes points plotted at positions 302, 304, and 306, which are non-limiting examples of positions where points may be plotted based on a strength (in amplitude) of the real and imaginary parts of such transmit power control command. For example, a strong, positive transmit power control command, which may be plotted at position 302 in "down" region 320, may be decoded to decrease uplink transmit power. In another example, a strong, negative transmit power control command, which may be plotted at position 306 in "up" region 340, may be decoded to increase uplink transmit power. In yet another example, a transmit power control command that is plotted within one of "hold" regions 310, 330, or 350, such as, for example, the transmit power control command plotted at position 304, may be decoded as (and/or assigned a value of) "hold", meaning that the uplink transmit power may remain unchanged. A point plotted within one of "hold" regions 310, 330, or 350 may be considered to be unreliable, and, as such, UE 110 may be configured to not trust (e.g., ignore) the power control command.

Although the transmit power control command decoding graph 300 of FIG. 3 is described with respect to the non-limiting example of a TD-SCDMA wireless communication system, it may be appreciated that a similar graph may be generated and used, based on the aspects described herein, for transmit power control command decoding across a broad variety of telecommunication systems, network architectures, and communication standards.

Figure 4:
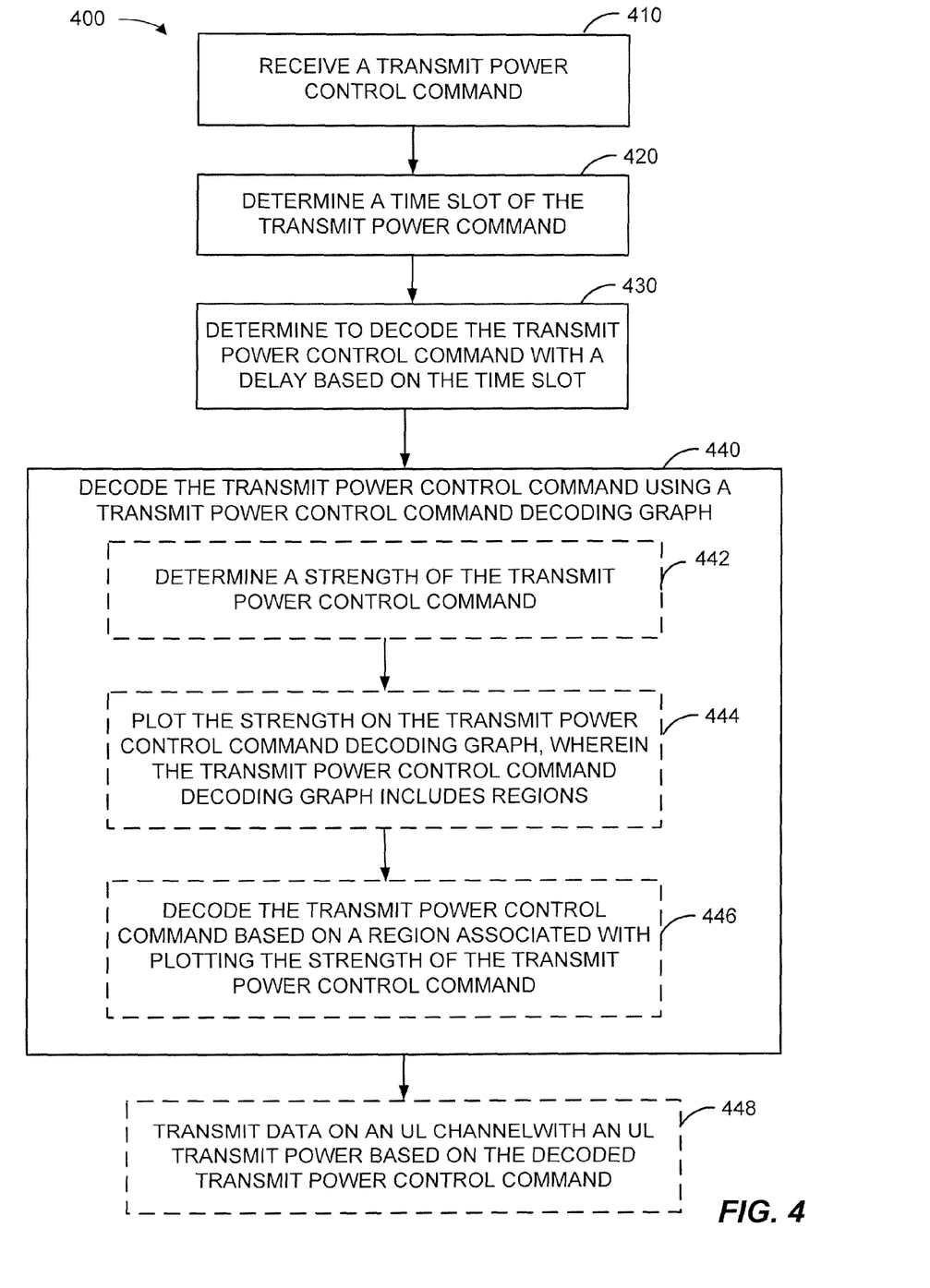
FIG. 4 is a flow chart of a method for controlling uplink transmit power.

Referring to FIG. 4, a method 400 for controlling uplink transmit power with an optimum delay may be performed by UE 110 in communication with Node B 160, both of FIG. 1. More particularly, aspects of method 400 may be performed by transmit power control module 120, time slot module 130, decoding module 140, transmit power control command decoding graph module 142, and/or transceiver module 150, all of FIG. 1.

At 410, the method 400 includes receiving a transmit power control command. For example, UE 110 may receive, via transceiver module 150, a transmit power control command 172 from Node B 160 on downlink channel 170 of FIG. 1. The transmit power control command 172 may be in one or more time slots (TS0 through TS6) of subframes 204 within frame 200 of FIG. 2.

At 420, the method 400 includes determining a time slot of the transmit power control command. For example, time slot module 130 may be configured to determine a time slot of the transmit power control command 172. Transmit power control command 172 may be sent by Node B 160 as part of TD-SCDMA frame 200 of FIG. 2. Each frame may be divided into subframes 204 and each subframe may be divided into time slots TS0, TS1, TS2, TS3, TS4, TS5, and TS6. Generally, transmit power control commands may control an uplink Coded Composite Transport Channel-Time Slot (UL CCTrCh-TS) based on the time slot in which the transmit power control command is located within the subframe.

At 430, the method 400 includes determining to decode the transmit power control command with a delay based on the time slot. For example, decoding module 140, in communication with time slot module 130, may be configured to determine to decode the transmit power control command 172 based on the time slot determined by time slot module 130.

In an aspect, if transmit power control command 172 is received in any one of time slots TS0, TS1, TS2, TS3, TS4, and/or TS5, transmit power control module 120 may adjust uplink transmit power in a subframe subsequent to the subframe in which the transmit power control command 172 was received. As such, there may be a decoding delay of one subframe. However, and in an aspect, if the transmit power control command 172 is received in the last time slot (TS6) of the subframe, then transmit power control module 120 may not be able to adjust the uplink transmit power in the subsequent subframe. In this case, the decoding delay may be two subframes. In an aspect, the two subframe delay may be a constant delay of two subframes.

In an aspect, a transmit power control command 172 may be spread across two time slots. In an aspect, if the transmit power control command 172 is within a non-TS6 (e.g., one of TS0, TS1, TS2, TS3, TS4, or TS5) time slot and the TS6 time slot, transmit power control module 120 may be configured to adjust uplink transmit power based on the power control command information in the non-TS6 time slot. In another aspect, if the transmit power control command 172 is within non-TS6 and TS6 time slots, transmit power control module 120 may be configured to adjust uplink transmit power based on the power control information in the TS6 time slot of the current subframe and power control information in the non-TS6 time slot of a subsequent frame. In any case, the decoding delay may be two subframes. In an aspect, the two subframe delay may be a constant delay of two subframes.

At 440, the method 400 includes decoding the transmit power control command using a transmit power control command decoding graph. For example, decoding module 140 and/or transmit power control command decoding graph module 142 may be configured to decode transmit power control command 172 using transmit power control command decoding graph 300 of FIG. 3.

In an aspect, decoding module 140 may be configured to decode the transmit power control command when a current subframe has an active uplink transmission status during a time when communications are discontinuous. In an aspect, there may not be a continuous transmission on the downlink because of characteristics of Time-Division Multiplexing (TDD) and/or Discontinuous Transmission (DTX) associated with a particular wireless communication system (e.g., TD-SCDMA). In a non-limiting example, Node B 160 may transmit to UE 110 on downlink channel 170 for four subframes, not transmit for four subframes, and then transmit for four subframes. As such, decoding module 140 may be configured to decode transmit power control command 172 when a current subframe has an active uplink transmission status during a time when downlink communications are discontinuous. For example, and in an aspect, if there is no activity in a current subframe K−1, then decoding module 140 may be configured to not decode a transmit power control command associated with a current subframe K. In an aspect, decoding module 140 may decode the transmit power control command associated with current subframe K as "hold". As such, the decoding delay may be one subframe.

Optionally, and in an aspect, action 440 may include actions 442, 444, and 446. At 442, the method 400 may optionally include determining a strength of the transmit power control command. For example, decoding module 140 and/or transmit power control command decoding graph module 142 may be configured to determine a strength (or similar metric), having an amplitude value, of a symbol associated with transmit power control command 172. The strength of transmit power control command 172 may include a real strength and an imaginary strength (in amplitude).

At 444, the method 400 may optionally include plotting the strength on the transmit power control command decoding graph, wherein the transmit power control command decoding graph includes regions. For example, decoding module 140 and/or transmit power control command decoding graph module 142 may be configured to plot the real and imaginary strengths (or similar metric), in amplitude, of a transmit power control command on transmit power control command decoding graph 300, which includes "hold" regions 310, 330, and 350, "down" region 320, and "up" region 340.

At 446, the method 400 may optionally include decoding the transmit power control command based on a region associated with plotting the strength of the transmit power control command. For example, decoding module 140 and/or transmit power control command decoding graph module 142 may be configured to decode a transmit power control command based on the region 310, 320, 330, 340, or 350, wherein the transmit power control command 172 falls within transmit power control command decoding graph 300.

For example, if a result of plotting transmit power control command 172 onto the transmit power control command decoding graph 300 yields a point that falls within the "up" region, decoding module 140 may decode transmit power control command 172 as "up". In another example, if a result of plotting transmit power control command 172 onto the transmit power control command decoding graph 300 yields a point that falls within the "down" region, decoding module 140 may decode transmit power control command 172 as "down". In yet another example, if a result of plotting transmit power control command 172 onto the transmit power control command decoding graph 300 yields a point that falls within the "hold" region, the transmit power control command 172 may be decoded as a "hold". The "hold" region of the transmit power control command decoding graph may be selected based on a determination that plotted points that fall within the "hold" region(s) may represent unreliable transmit power control commands and, as such, the UE 110 and/or transmit power control module 120 may be configured to not adjust the uplink transmit power control based on such unreliable transmit power control commands.

At 448, the method 400 may optionally include transmitting data on an uplink channel based on the decoded transmit power control command. For example, transceiver module 150 may be configured to transmit information on uplink channel 180, of FIG. 1, at an uplink transmit power determined based on the decoded transmit power control command 172.

Figure 5:
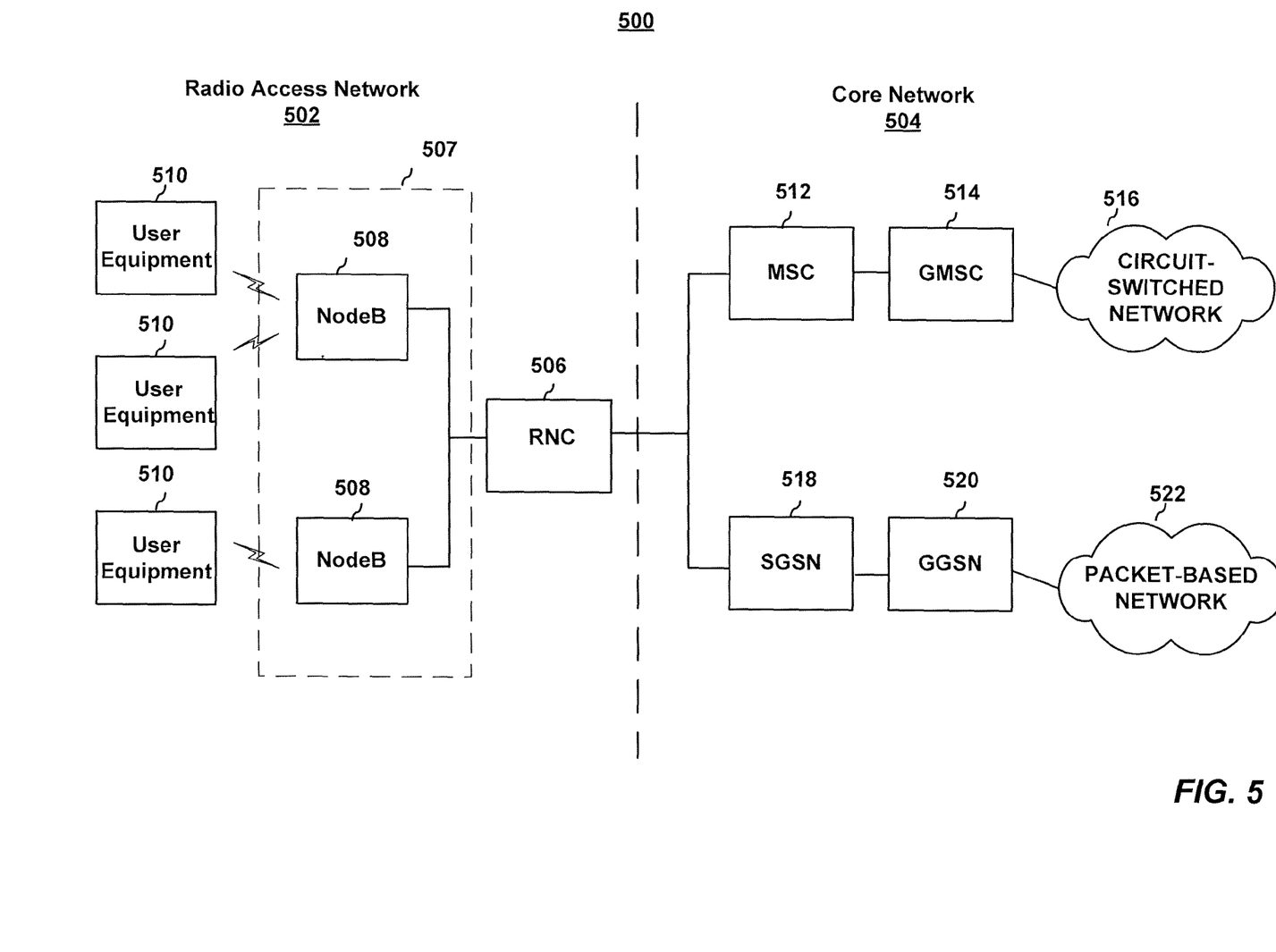
FIG. 5 is a block diagram illustrating a telecommunications system.

Referring to FIG. 5, UE 110 and Node B 160 may operate in a telecommunications system 500. As described herein, the various concepts presented throughout this disclosure may be implemented across a broad variety of telecommunication systems, network architectures, and communication standards. By way of example and without limitation, the aspects of the present disclosure described herein and illustrated by the figures, are presented with reference to a UMTS system employing a TD-SCDMA standard.

In this example, the UMTS system includes a (radio access network) RAN 502 (e.g., UTRAN) that provides various wireless services including telephony, video, data, messaging, broadcasts, and/or other services. The RAN 502 may be divided into a number of Radio Network Subsystems (RNSs) such as an RNS 507, each controlled by a Radio Network Controller (RNC) such as an RNC 506. For clarity, only the RNC 506 and the RNS 507 are shown; however, the RAN 502 may include any number of RNCs and RNSs in addition to the RNC 506 and RNS 507. The RNC 506 is an apparatus responsible for, among other things, assigning, reconfiguring and releasing radio resources within the RNS 507. The RNC 506 may be interconnected to other RNCs (not shown) in the RAN 502 through various types of interfaces such as a direct physical connection, a virtual network, or the like, using any suitable transport network.

The geographic region covered by the RNS 507 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 508 are shown; however, the RNS 507 may include any number of wireless Node Bs. The Node Bs 508 may be Node B 160 of FIG. 1.

The Node Bs 508 provide wireless access points to a core network 504 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 510 are shown in communication with the Node Bs 508. The UEs 510 may be UE 110 of FIG. 1. The downlink (downlink), also called the forward link, refers to the communication link from a Node B to a UE, and the uplink (uplink), also called the reverse link, refers to the communication link from a UE to a Node B.

The core network 504, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 504 supports circuit-switched services with a mobile switching center (MSC) 512 and a gateway MSC (GMSC) 514. One or more RNCs, such as the RNC 506, may be connected to the MSC 512. The MSC 512 is an apparatus that controls call setup, call routing, and UE mobility functions. The MSC 512 also includes a visitor location register (VLR) (not shown) that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR to determine the UE's location and forwards the call to the particular MSC serving that location.

The core network 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard GSM circuit-switched data services. The GGSN 520 provides a connection for the RAN 502 to a packet-based network 522. The packet-based network 522 may be the Internet, a private data network, or some other suitable packet-based network. The primary function of the GGSN 520 is to provide the UEs 510 with packet-based network connectivity. Data packets are transferred between the GGSN 520 and the UEs 510 through the SGSN 518, which performs primarily the same functions in the packet-based domain as the MSC 512 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (uplink) and downlink (downlink) between a Node B 508 and a UE 510, but divides uplink and downlink transmissions into different time slots in the carrier.

Figure 6:
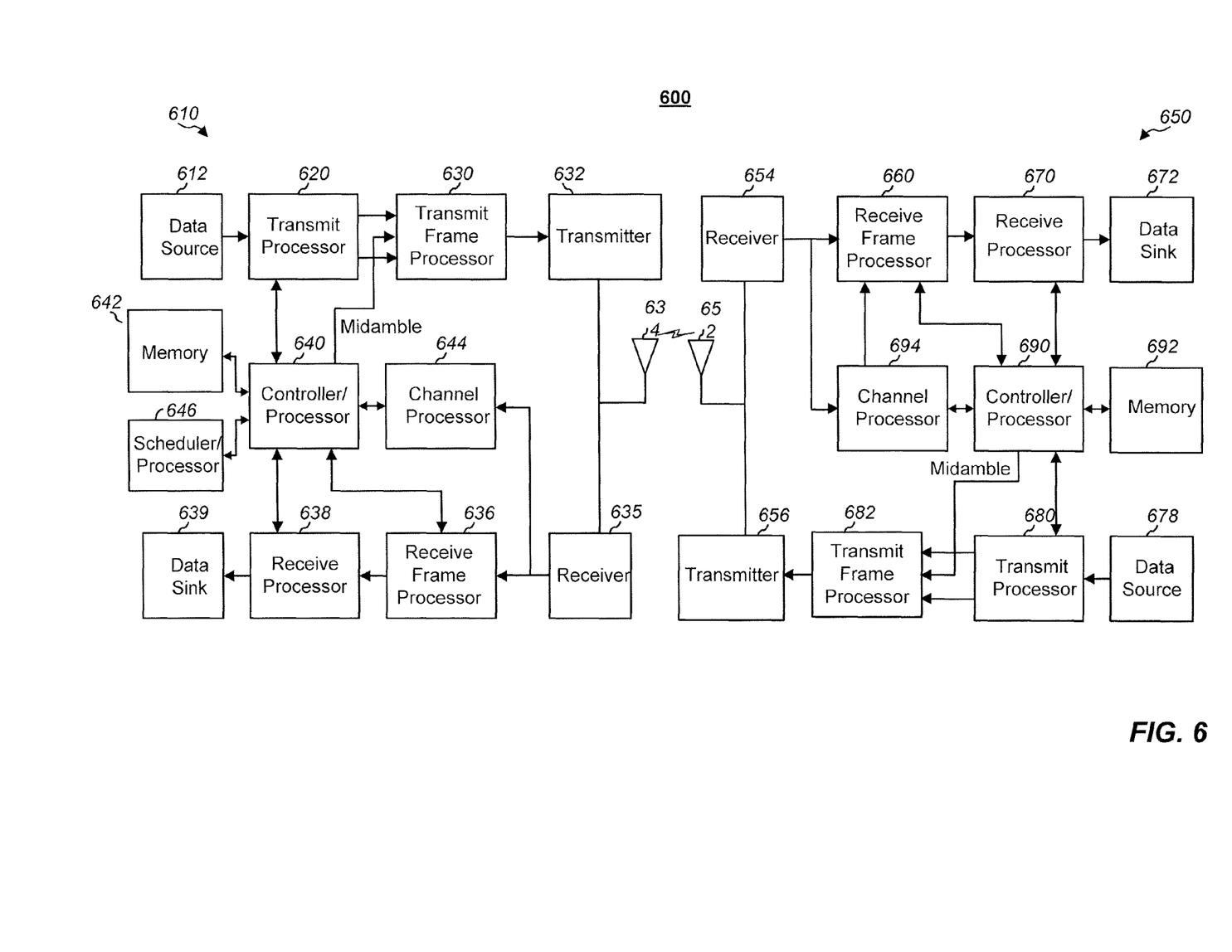
FIG. 6 is a block diagram illustrating a UE in communication with a Node B.

Referring to FIG. 6, a Node B 610 is in communication with a UE 650 in a RAN 600, where the RAN 600 may be the RAN 502 of FIG. 5, the Node B 610 may be the Node B 508 of FIG. 5 and/or the Node B 160 of FIG. 1, and the UE 650 may be the UE 510 of FIG. 5 and/or UE 110 of FIG. 1. In the downlink communication, a transmit processor 620 may receive data from a data source 612 and control signals from a controller/processor 640. The transmit processor 620 provides various signal processing functions for the data and control signals, as well as reference signals (e.g., pilot signals). For example, the transmit processor 620 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 644 may be used by a controller/processor 640 to determine the coding, modulation, spreading, and/or scrambling schemes for the transmit processor 620. These channel estimates may be derived from a reference signal transmitted by the UE 650 or from feedback contained in the midamble 214 (FIG. 2) from the UE 650. The symbols generated by the transmit processor 620 are provided to a transmit frame processor 630 to create a frame structure. The transmit frame processor 630 creates this frame structure by multiplexing the symbols with a midamble 214 (FIG. 2) from the controller/processor 640, resulting in a series of frames. The frames are then provided to a transmitter 632, which provides various signal conditioning functions including amplifying, filtering, and modulating the frames onto a carrier for downlink transmission over the wireless medium through smart antennas 634. The smart antennas 634 may be implemented with beam steering bidirectional adaptive antenna arrays or other similar beam technologies.

At the UE 650, a receiver 654 receives the downlink transmission through an antenna 652 and processes the transmission to recover the information modulated onto the carrier. The information recovered by the receiver 654 is provided to a receive frame processor 660, which parses each frame, and provides the midamble 214 (FIG. 2) to a channel processor 694 and the data, control, and reference signals to a receive processor 670. The receive processor 670 then performs the inverse of the processing performed by the transmit processor 620 in the Node B 610. More specifically, the receive processor 670 descrambles and despreads the symbols, and then determines the most likely signal constellation points transmitted by the Node B 610 based on the modulation scheme. These soft decisions may be based on channel estimates computed by the channel processor 694. The soft decisions are then decoded and deinterleaved to recover the data, control, and reference signals. The CRC codes are then checked to determine whether the frames were successfully decoded. The data carried by the successfully decoded frames will then be provided to a data sink 672, which represents applications running in the UE 650 and/or various user interfaces (e.g., display). Control signals carried by successfully decoded frames will be provided to a controller/processor 690. When frames are unsuccessfully decoded by the receiver processor 670, the controller/processor 690 may also use an acknowledgement (ACK) and/or negative acknowledgement (NACK) protocol to support retransmission requests for those frames.

In the uplink, data from a data source 678 and control signals from the controller/processor 690 are provided to a transmit processor 680. The data source 678 may represent applications running in the UE 650 and various user interfaces (e.g., keyboard). Similar to the functionality described in connection with the downlink transmission by the Node B 610, the transmit processor 680 provides various signal processing functions including CRC codes, coding and interleaving to facilitate FEC, mapping to signal constellations, spreading with OVSFs, and scrambling to produce a series of symbols. Channel estimates, derived by the channel processor 694 from a reference signal transmitted by the Node B 610 or from feedback contained in the midamble transmitted by the Node B 610, may be used to select the appropriate coding, modulation, spreading, and/or scrambling schemes. The symbols produced by the transmit processor 680 will be provided to a transmit frame processor 682 to create a frame structure. The transmit frame processor 682 creates this frame structure by multiplexing the symbols with a midamble 214 (FIG. 2) from the controller/processor 690, resulting in a series of frames. The frames are then provided to a transmitter 656, which provides various signal conditioning functions including amplification, filtering, and modulating the frames onto a carrier for uplink transmission over the wireless medium through the antenna 652.

The uplink transmission is processed at the Node B 610 in a manner similar to that described in connection with the receiver function at the UE 650. A receiver 635 receives the uplink transmission through the antenna 634 and processes the transmission to recover the information modulated onto the carrier. The information recovered by the receiver 635 is provided to a receive frame processor 636, which parses each frame, and provides the midamble 214 (FIG. 2) to the channel processor 644 and the data, control, and reference signals to a receive processor 638. The receive processor 638 performs the inverse of the processing performed by the transmit processor 680 in the UE 650. The data and control signals carried by the successfully decoded frames may then be provided to a data sink 639 and the controller/processor, respectively. If some of the frames were unsuccessfully decoded by the receive processor, the controller/processor 640 may also use an acknowledgement (ACK) and/or negative acknowledgement (NACK) protocol to support retransmission requests for those frames.

The controller/processors 640 and 690 may be used to direct the operation at the Node B 610 and the UE 650, respectively. For example, the controller/processors 640 and 690 may provide various functions including timing, peripheral interfaces, voltage regulation, power management, and other control functions. The computer readable media of memories 642 and 692 may store data and software for the Node B 610 and the UE 650, respectively. For example, the memory 692 of the UE 650 may store a power adjustment module 691 which, when executed by the controller/processor 690, configures the UE 650 to adjust the transmission power of an uplink channel or an enhanced high speed channel. A scheduler/processor 646 at the Node B 610 may be used to allocate resources to the UEs and schedule downlink and/or uplink transmissions for the UEs.

Figure 7:
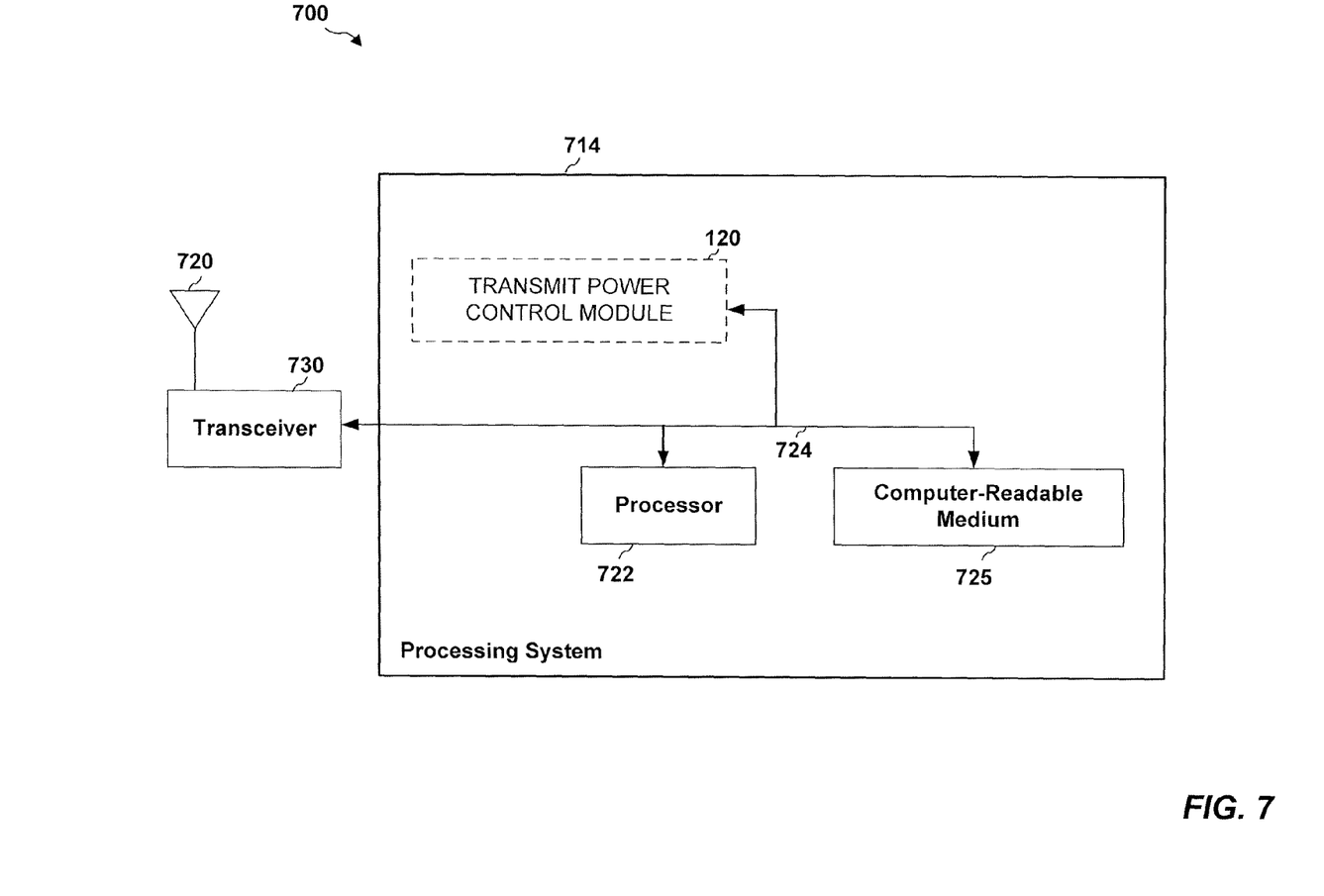
FIG. 7 is a block diagram illustrating a hardware implementation for an apparatus employing a processing system according to one aspect of the present disclosure.

Referring to FIG. 7, an example of a hardware implementation for an apparatus 700 may employ a processing system 714, including transmit power control module 120 of FIG. 1. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722, transmit power control module 120, and the computer-readable medium 725. The bus 724 may also link various other circuits such as timing sources, peripherals, voltage regulators, and power management circuits, which are well known in the art, and therefore, will not be described any further.

The apparatus includes a processing system 714 coupled to a transceiver 730. Transceiver 730 may be transceiver module 150 of FIG. 1. The transceiver 730 is coupled to one or more antennas 720. The transceiver 730 enables communicating with various other apparatus over a transmission medium. The processing system 714 includes a processor 722 coupled to a computer-readable medium 725. The processor 722 is responsible for general processing, including the execution of software stored on the computer-readable medium 725. The software, when executed by the processor 722, causes the processing system 714 to perform the various functions described for any particular apparatus. The computer-readable medium 725 may also be used for storing data that is manipulated by the processor 722 when executing software. In an aspect, the computer-readable medium 725 may be a non-transitory computer-readable medium.

The processing system 714 includes transmit power control module 120, which includes time slot module 130, decoding module 140, and transmit power control command decoding graph module 142. Transmit power control module 120, time slot module 130, decoding module 140, and/or transmit power control command decoding graph module 142 are for, at least, receiving a transmit power control command, determining a time slot of the transmit power control command, determining to decode the transmit power control command based on the time slot, and/or decoding the transmit power control command using a transmit power control command decoding graph. The modules may be software modules running in the processor 722, resident/stored in the computer-readable medium 725, one or more hardware modules coupled to the processor 722, or some combination thereof. The processing system 714 may be a component of the UE 650 of FIG. 6, UE 510 of FIG. 5, and/or UE 110 of FIG. 1 and may include the memory 692, and/or the controller/processor 690, both of FIG. 6.

In one configuration, an apparatus such as a UE is configured for wireless communication including means for receiving a transmit power control command, means for determining a time slot of the transmit power control command, means for determining to decode the transmit power control command based on the time slot, and/or means for decoding the transmit power control command using a transmit power control command decoding graph. In one aspect, the above means may be the channel processor 694, the receive frame processor 660, the receive processor 670, the controller/processor 690, transmit power control module 120, and/or the processing system 714 configured to perform the functions recited by the aforementioned means. In another aspect, the aforementioned means may be a module or any apparatus configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling uplink transmit power, comprising:
   receiving a transmit power control command;
   determining a time slot of the transmit power control command within a current subframe;
   determining a delay for decoding the transmit power control command, based on the time slot within the current subframe; and
   decoding the transmit power control command, after the delay, using a transmit power control command decoding graph with a one subframe delay in an immediately subsequent subframe when the determined time slot is not the last time slot within the current subframe.

2. The method of claim 1, wherein decoding comprises:
   determining a strength of the transmit power control command;
   plotting the strength on the transmit power control command decoding graph, wherein the transmit power control command decoding graph includes regions; and
   decoding the transmit power control command, after the delay, based on a region associated with plotting the strength of the transmit power control command.

3. The method of claim 2,
   wherein determining a strength of the transmit power control command comprises:
      determining a strength in amplitude of a real part of the transmit power control command; and
      determining a strength in amplitude of an imaginary part of the transmit power control command, and
   wherein plotting the strength comprises:
      plotting the strength of the real part of the transmit power control command on the y-axis of the transmit power control command decoding graph; and plotting the strength of the imaginary part of the transmit power control command on the x-axis of the transmit power control command decoding graph.

4. The method of claim 2, wherein determining a strength of the transmit power control command comprises determining an amplitude of the transmit power control command.

5. The method of claim 2,
wherein the regions are associated with possible transmit power control commands in a wireless communication system, and
wherein decoding the transmit power control command, after the delay, based on a region comprises decoding the transmit power control command as up, down, or hold based on the region associated with plotting the strength of the transmit power control command.

6. The method of claim 5, wherein the regions are further associated with a hold status used when a transmit power control command is unreliable.

7. The method of claim 5, wherein:
the wireless communication system is TD-SCDMA, and
different ones of the regions represent an up transmit power control command and a down transmit power control command.

8. The method of claim 1, wherein determining the delay for decoding comprises determining to decode the transmit power control command with a delay of two subframes when the time slot is the last time slot within the current subframe or when the time slot comprises a pair of time slots in which one of the pair is the last time slot within the current subframe.

9. The method of claim 1, wherein decoding further comprises decoding the transmit power control command with a two subframe delay when the time slot is the last time slot within the current subframe.

10. The method of claim 1, wherein decoding further comprises decoding the transmit power control command with a two subframe delay when the time slot comprises a pair of time slots in which one of the pair is the last time slot within the current subframe.

11. The method of claim 1, wherein decoding comprises decoding the transmit power control command when the current subframe has an active uplink transmission status during a time when communications are discontinuous.

12. The method of claim 1, further comprising transmitting data on an uplink channel with an uplink transmit power based on the decoded transmit power control command.

13. A non-transitory computer-readable medium storing computer executable code, comprising:
code for receiving a transmit power control command;
code for determining a time slot of the transmit power control command within a current sub-frame;
code for determining a delay for decoding the transmit power control command based on the time slot within the current subframe; and
code for decoding the transmit power control command, after the delay, using a transmit power control command decoding graph with a one subframe delay in an immediately subsequent subframe when the determined time slot is not the last time slot within the current subframe.

14. An apparatus for controlling uplink transmit power, comprising:
means for receiving a transmit power control command;
means for determining a time slot of the transmit power control command within a current subframe;
means for determining a delay for decoding the transmit power control command based on the time slot within the current subframe; and
means for decoding the transmit power control command, after the delay, using a transmit power control command decoding graph with a one subframe delay in an immediately subsequent subframe when the determined time slot is not the last time slot within the current subframe.

15. An apparatus for controlling uplink transmit power, comprising:
at least one memory; and
a processor configured to:
receive a transmit power control command;
determine a time slot of the transmit power control command within a current subframe; determine a delay for decoding the transmit power control command based on the time slot within the current subframe, and
decode the transmit power control command, after the delay, using a transmit power control command decoding graph with a one subframe delay in an immediately subsequent subframe when the determined time slot is not the last time slot within the current subframe.

16. The apparatus of claim 15, wherein the processor is further configured to:
determine a strength of the transmit power control command;
plot the strength on the transmit power control command decoding graph, wherein the transmit power control command decoding graph includes regions; and
decode the transmit power control command, after the delay, based on a region associated with plotting the strength of the transmit power control command.

17. The apparatus of claim 16,
wherein the processor is further configured to:
determine a strength in amplitude of a real part of the transmit power control command; and
determine a strength in amplitude of an imaginary part of the transmit power control command,
plot the strength of the real part of the transmit power control command on the y-axis of the transmit power control command decoding graph; and
plot the strength of the imaginary part of the transmit power control command on the x-axis of the transmit power control command decoding graph.

18. The apparatus of claim 16, wherein the processor is further configured to determine an amplitude of the transmit power control command.

19. The apparatus of claim 16,
wherein the regions are associated with possible transmit power control commands in a wireless communication system, and
wherein the processor is configured to decode, after the delay, based on a region by decoding the transmit power control command as up, down, or hold based on the region associated with plotting the strength of the transmit power control command.

20. The apparatus of claim 19, wherein the regions are further associated with a hold status used when a transmit power control command is unreliable.

21. The apparatus of claim 19, wherein:
the wireless communication system is TD-SCDMA, and
different ones of the regions represent an up transmit power control command and a down transmit power control command.

22. The apparatus of claim 15, wherein the processor is further configured to determine a two subframe delay for decoding the transmit power control command when the time slot is the last time slot within the current subframe or when the time slot comprises a pair of time slots in which one of the pair is the last time slot within the current subframe.

23. The apparatus of claim 15, wherein the processor is further configured to decode the transmit power control command with a two subframe delay when the time slot is the last time slot within the current subframe.

24. The apparatus of claim 15, wherein the processor is configured to decode the transmit power control command with a two subframe delay when the time slot comprises a pair of time slots in which one of the pair is the last time slot within the current subframe.

25. The apparatus of claim 15, wherein the processor is further configured to decode the transmit power control command when the current subframe has an active uplink transmission status during a time when communications are discontinuous.

26. The apparatus of claim 15, further comprising a transceiver configured to transmit data on an uplink channel with an uplink transmit power based on the decoded transmit power control command.

* * * * *